(12) United States Patent
Crowell et al.

(10) Patent No.: US 6,357,718 B1
(45) Date of Patent: Mar. 19, 2002

(54) METHOD AND APPARATUS FOR JACKSCREW INSERTION

(75) Inventors: James R. Crowell, Huntertown, IN (US); Mark F. Fleer, Saginaw, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/347,041

(22) Filed: Jul. 2, 1999

(51) Int. Cl.⁷ .............................................. A47B 91/02
(52) U.S. Cl. .................. 248/677; 248/188.4; 411/60.2; 411/172; 411/181
(58) Field of Search ........................... 403/24, 25, 299; 29/402.17; 411/44, 45, 54, 57.1, 60.1, 60.2, 55, 80.5, 427, 75, 172, 181, 338, 339; 248/188.2, 188.4, 188.5, 677, 678

(56) References Cited

U.S. PATENT DOCUMENTS

| 239,556 A | * | 3/1881 | Sabin ....................... 248/188.4 |
| 785,982 A | * | 3/1905 | Smith ....................... 248/188.4 |
| 824,525 A | * | 6/1906 | Bonney .................... 248/188.4 |
| 1,528,287 A | * | 3/1925 | Ajello ...................... 248/188.4 |
| 1,632,383 A | * | 6/1927 | Seiden et al. ............. 248/188.4 |
| 2,150,361 A | * | 3/1939 | Chobert ........................ 411/44 |
| 2,828,578 A | * | 4/1958 | McCabe ................... 248/188.4 |
| 3,369,441 A | * | 2/1968 | Kosar ......................... 411/410 |
| 3,868,079 A | * | 2/1975 | Johnson ................... 248/188.4 |
| 4,806,053 A | * | 2/1989 | Herb ........................... 411/32 |
| 4,818,163 A | * | 4/1989 | Bereiter et al. ............... 411/44 |
| 4,856,945 A | * | 8/1989 | Bareis ......................... 408/234 |
| 4,957,402 A | * | 9/1990 | Klein et al. .................... 411/84 |
| 5,064,311 A | * | 11/1991 | Giroux et al. ............ 405/259.1 |
| 5,374,145 A | * | 12/1994 | Mairesse et al. ........... 411/60.1 |
| 5,599,140 A | * | 2/1997 | Wright .................... 405/259.6 |
| 5,707,190 A | * | 1/1998 | Hiraguri et al. ........... 411/60.1 |
| 5,767,472 A | * | 6/1998 | Walters ................... 29/402.08 |

* cited by examiner

Primary Examiner—Daniel W. Howell
(74) Attorney, Agent, or Firm—Damian Wasserbauer Esq.; Armstrong Teasdale LLP

(57) ABSTRACT

A jackscrew insert and a method for jackscrew insertion into existing mounting openings in a machine base are described. A jacking shoulder is provided by a modification of the existing mounting openings utilizing a jackscrew machining tool. The jackscrew machining tool includes a cutting edge which cuts the jacking shoulder into the machine base adjacent the existing mounting openings. Should the existing mounting openings not be modified for proper utilization of the jackscrew insert, a jackscrew assembly and method for use are also described.

8 Claims, 5 Drawing Sheets

METHOD AND APPARATUS FOR JACKSCREW INSERTION

BACKGROUND OF THE INVENTION

This invention relates generally to jackscrews and, more particularly, to jackscrew inserts and methods of jackscrew insertion.

Bases for machinery sometimes include multiple mounting openings. Typically, only one existing mounting opening will be used for mounting the machinery while remaining mounting openings are left unused. A jackscrew may be inserted within one or more of the unused openings. The jackscrew aids in proper positioning and alignment of the machinery prior to and during final leveling and fastening of the machinery. However, the jackscrew requires a threading which is not found in the existing mounting openings. The opening into which the jackscrew is to be inserted thus needs to be modified prior to insertion of the jackscrew.

Typically, modification of the existing mounting openings is performed by drilling and tapping the remaining mounting openings to provide space and threading for the jackscrew to function. One disadvantage of this modification is that modified mounting openings can no longer be used as mounting openings should additional mounting openings be desired. Another disadvantage of the typical modification of mounting openings is that the modification can be expensive and time consuming.

Accordingly, it would be desirable to provide a quick and easy modification of mounting openings in the machine base. Additionally, it would be desirable if a jackscrew opening could be used as a mounting opening.

BRIEF SUMMARY OF THE INVENTION

In an exemplary embodiment of the invention, a jackscrew insert includes a jacking shoulder, a first end, a second end, and an opening which extends through the jackscrew insert from the first end to the second end.

More particularly, an existing mounting opening may be machined utilizing a jackscrew machining tool. The jackscrew machining tool includes a drive shaft connected to a tool stop. The tool stop prevents removal of an excess amount of material from a machine base surrounding a modified mounting opening. A cutting edge extends from the tool stop, with a pilot bushing extending from the cutting edge. Once the existing mounting opening is modified to include the jacking shoulder, the jackscrew insert is positioned within the modified mounting opening for securing a jackscrew. Should additional mounting openings be desired the jackscrew insert may be removed and the modified mounting opening utilized.

The modification of the existing mounting openings is made inexpensive and quickly. In addition, the jackscrew insert allows for conversion of the modified mounting openings into equivalent existing mounting openings.

DETAILED DESCRIPTION OF THE INVENTION

Figure 1:
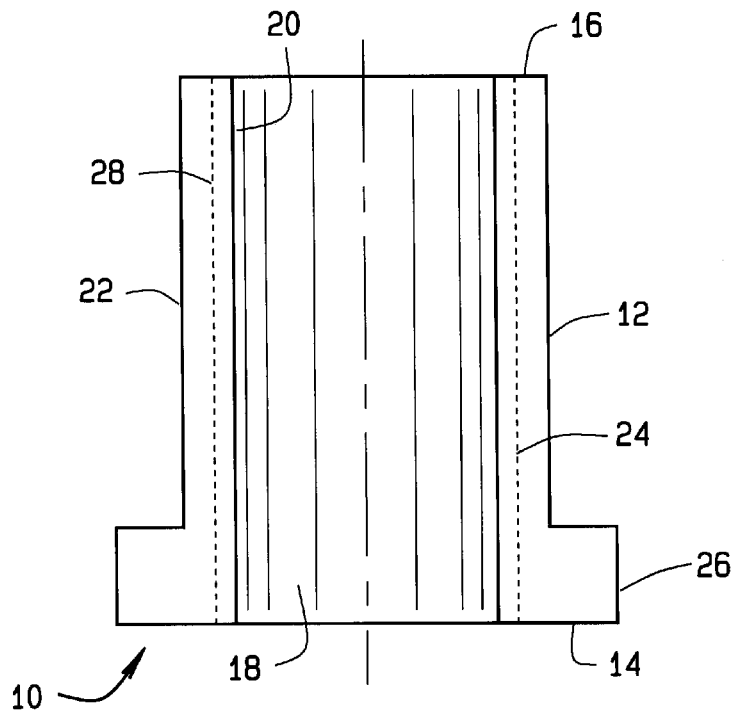
FIG. 1 is a schematic view of a jackscrew insert.

FIG. 1 is an illustration of a jackscrew insert 10. Jackscrew insert 10 includes a substantially cylindrical member 12 including a first end 14, a second end 16, and an opening 18 therethrough. Opening 18 extends from first end 14 to second end 16 and is substantially circular. Cylindrical member 12 further includes an inside surface 20 and an outside surface 22.

Jackscrew insert 10 further includes a plurality of threads 24 on inside surface 20 of cylindrical member 12. Threads 24 extend from first end 14 to second end 16 of cylindrical member 12. Cylindrical member 12 further includes a first portion 26 adjacent first end 14, and a second portion 28 extending substantially along cylindrical member 12 from first portion 26 to second end 16. First portion 26 has a diameter which is larger than a diameter of second portion 28.

Figure 2:
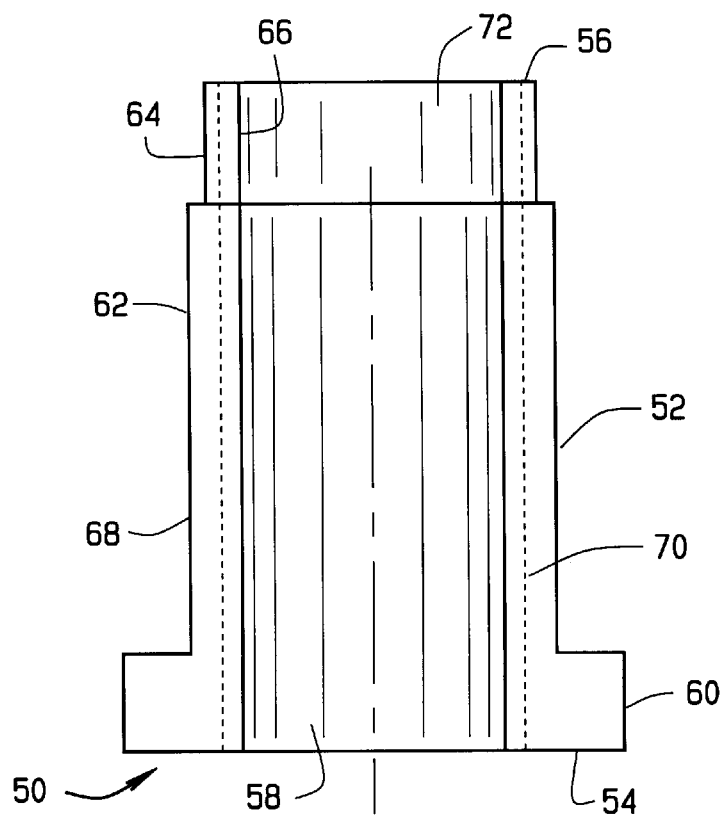
FIG. 2 is an alternate embodiment of a jackscrew insert.

FIG. 2 illustrates an alternate embodiment of a jackscrew insert 50. Jackscrew insert 50 includes a substantially cylindrical member 52 including a first end 54, a second end 56, and an opening 58 which is substantially circular and extends through member 52 from first end 54 to second end 56. Substantially cylindrical member 52 further includes a first portion 60, a second portion 62, and a third portion, or wrench flat, 64. Cylindrical member 52 also includes an inside surface 66 and an outside surface 68.

Jackscrew insert 50 includes a plurality of threads 70 on inside surface 66 of member 52 which extend from first end 54 to second end 56. First portion 60 is adjacent first end 54, and second portion 62 extends substantially along cylindrical member 52 from first portion 60 towards second end 56. Third portion 64 extends from second end 56 to second portion 62 and includes at least one flattened area 72. Third portion 64 is substantially oblong in shape and provides flattened area 72 for utilization of a standard wrench (not shown). First portion 60 has a diameter which is larger than a diameter of second portion 62.

Figure 3:
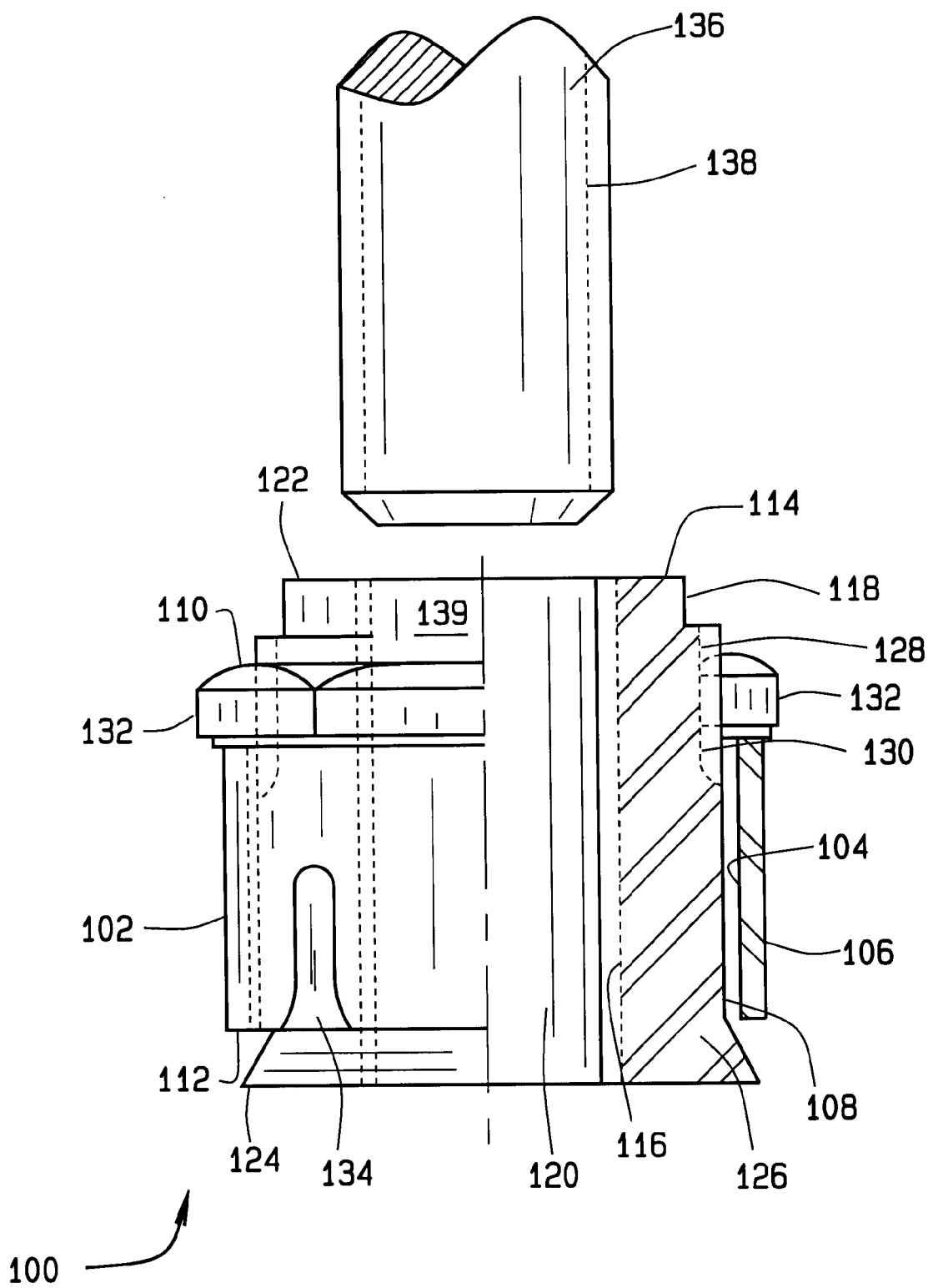
FIG. 3 is a schematic view of a jackscrew assembly.

FIG. 3 is an illustration of a jackscrew assembly 100 including a first member, or expanding collet, 102 which is substantially cylindrical. First member 102 includes an inside surface 104, an outside surface 106, and a substantially circular opening 108. Inside surface 104, outside surface 106, and circular opening 108 extend from a top end 110 to a bottom end 112 of first member 102.

Jackscrew assembly 100 also includes a second member 114 which is substantially cylindrical. Second member 114 is connected to and surrounded by first member 102. Second member 114 includes an inside surface 116, an outside surface 118, and a circular opening 120. Inside surface 116, outside surface 118, and circular opening 120 extend from a top end 122 to a bottom end 124 of second member 114. Second member inside surface 116 includes a plurality of jackscrew threads 126 thereon which extend from top end 122 to bottom end 124 of second member 114.

Second member 114 further includes a plurality of jam nut threads 128 on outside surface 118 which extend along a first area 130 of outside surface 118. First member 102 is concentric with second member 114 and further includes at least one jam nut 132 which extends from first member 102 to second member jam nut threads 128 on second member outside surface 118. First member 102 is connected to second member 114 by jam nut 132 which threadedly engages second member 114 at jam nut threads 128.

Second member bottom 124 is cone shaped and extends beyond first member bottom 112. First member 102 and second member 114 have a first diameter and a second diameter, respectively. In the present embodiment, second member top 122 extends beyond first member top 110 and the second diameter is smaller than the first diameter, except at second member bottom 124. Second member top 122 includes at least one flattened area 139 and is substantially oblong in shape to provide flattened area 139 for utilization of a standard wrench (not shown).

First member 102 includes at least one second opening, or slit, 134 which extends through first member bottom 112. Slit 134 extends from first member bottom 112 toward first member top 110. A jackscrew 136 including jackscrew threads 138 engage jackscrew threads 126 on second member inside surface 116.

Figure 4:
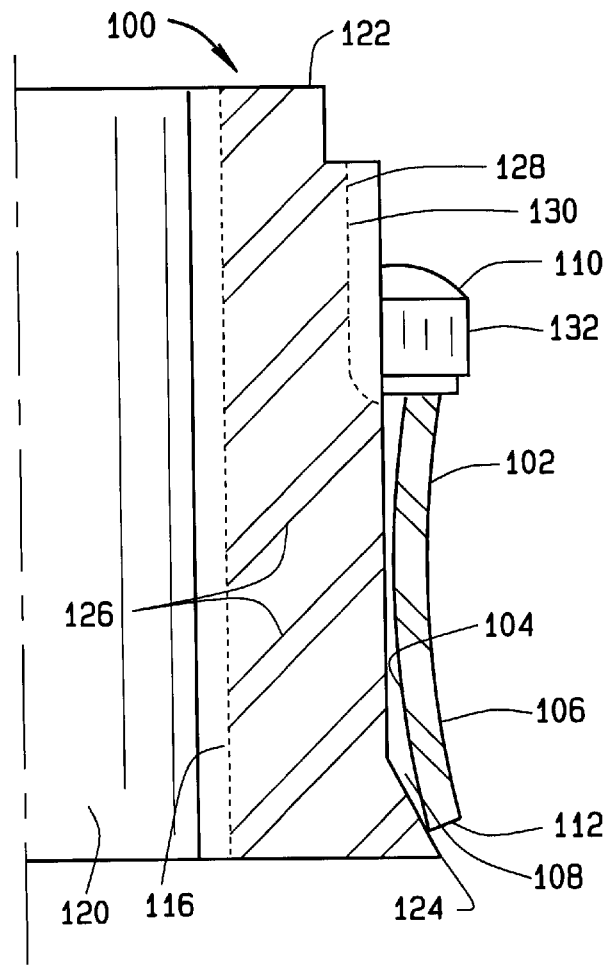
FIG. 4 is a schematic view of a portion of the jackscrew assembly shown in FIG. 3.

FIG. 4 is a schematic illustration of a portion of jackscrew assembly 100 shown in FIG. 3. As shown in FIG. 4, jackscrew assembly first member 102 is adjacent second member 114 due to the rotation of jam nut 132. Once jam nut 132 is tightened the cone shape of second member bottom 124 forces first member bottom 112 to expand outward utilizing opening, or slit, 134. The outward expansion of first member bottom 112 is restrained by walls of existing mounting openings (not shown).

Tightening of jam nut 132 produces a deformation between the existing mounting openings and first member 102. The deformation between the existing mounting openings and first member 102, along with friction provides sufficient force to resist movement between jackscrew assembly 100 and a machine base (not shown in FIG. 4). Assembly 100 may be made from any material having sufficient strength, such as aluminum, bronze, steel, or stainless steel. The diameter of first member 102 and second member bottom 124 are selected to be compatible with the diameter of the existing mounting openings.

Figure 5:
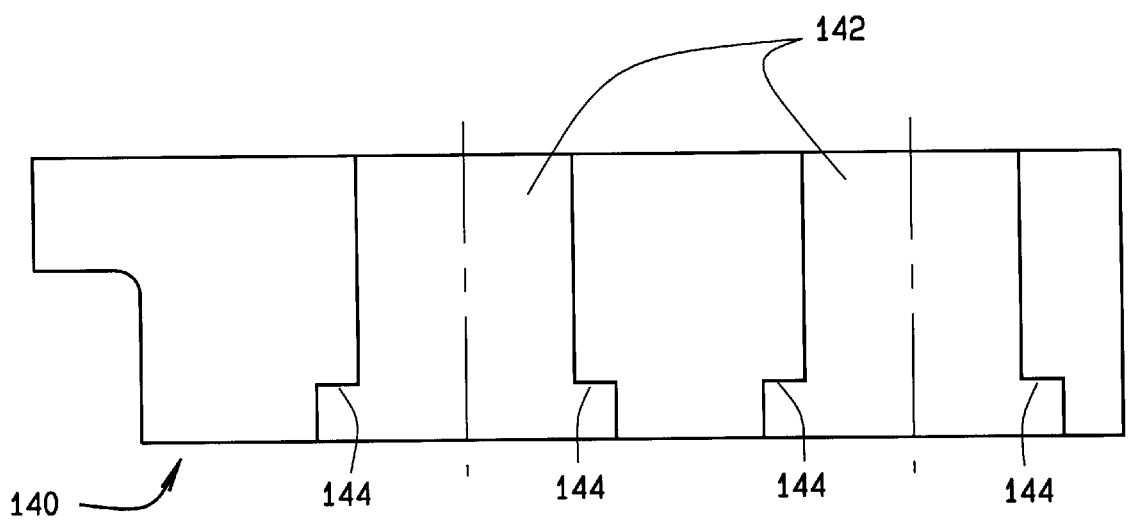
FIG. 5 is a schematic view of a machine base including modified mounting openings which utilize the jackscrew insert shown in FIGS. 1 and 2.

FIG. 5 is a schematic illustration of a machine base 140 with modified mounting openings 142 which are substantially circular. Machine base 140 includes existing mounting openings (not shown) and jacking shoulders 144 cut into modified mounting openings 142. Jacking shoulders 144 are utilized by jackscrew insert 10 (shown in FIG. 1) or jackscrew insert 50 (shown in FIG. 2).

Figure 6:
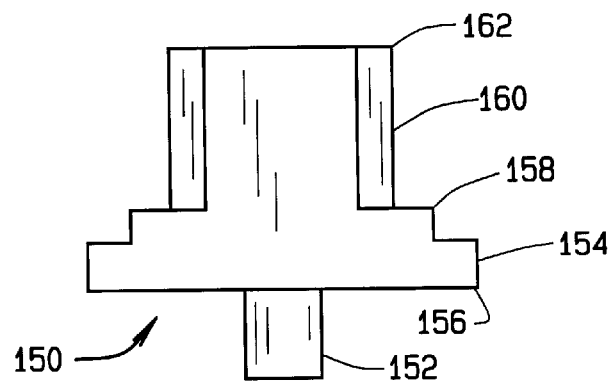
FIG. 6 is a schematic view of a first embodiment of a jackscrew cutting tool which provides the modified mounting openings shown in FIG. 5.

FIG. 6 is a first embodiment of a jackscrew machining tool 150 including a drive shaft 152 connected to a tool stop 154 at a first end 156. A cutting edge 158 extends from tool stop 154, and a pilot bushing 160 extends from cutting edge 158 to a second end 162. Cutting edge 158 and pilot bushing 160 are stepped and substantially circular in shape and pilot bushing 160 has a diameter which is compatible with a diameter of an existing mounting opening (not shown) in a machine base 140 (shown in FIG. 5).

Cutting edge 158 has a diameter which is larger than the diameter of pilot bushing 160 and the existing mounting opening. Tool stop 154 is circular in shape and has a diameter which is larger than the diameter of cutting edge 158. Jackscrew machining tool 150 may be made from any material suitable for cutting machine base 140 (shown in FIG. 5), such as a combination of tool steel and hardened steel or materials such as silicon or tungsten carbide. Jackscrew machining tool 150 is utilized to modify existing mounting openings (not shown) for use of jackscrew insert 10 (shown in FIG. 1) or 50 (shown in FIG. 2).

Initially, pilot bushing 160 is aligned with at least one of the existing mounting openings in machine base 140 (shown in FIG. 5). Power is then provided to jackscrew machining tool 150 by a hand held drill motor (not shown) attached to drive shaft 152. Material which is substantially perpendicular to at least one of the existing mounting openings is then removed. More particularly, pilot bushing 160 is inserted into the existing mounting openings with cutting edge 158 and rotated to provide jacking shoulders 144 (shown in FIG. 5) in modified mounting openings 142 (shown in FIG. 5).

Figure 7:
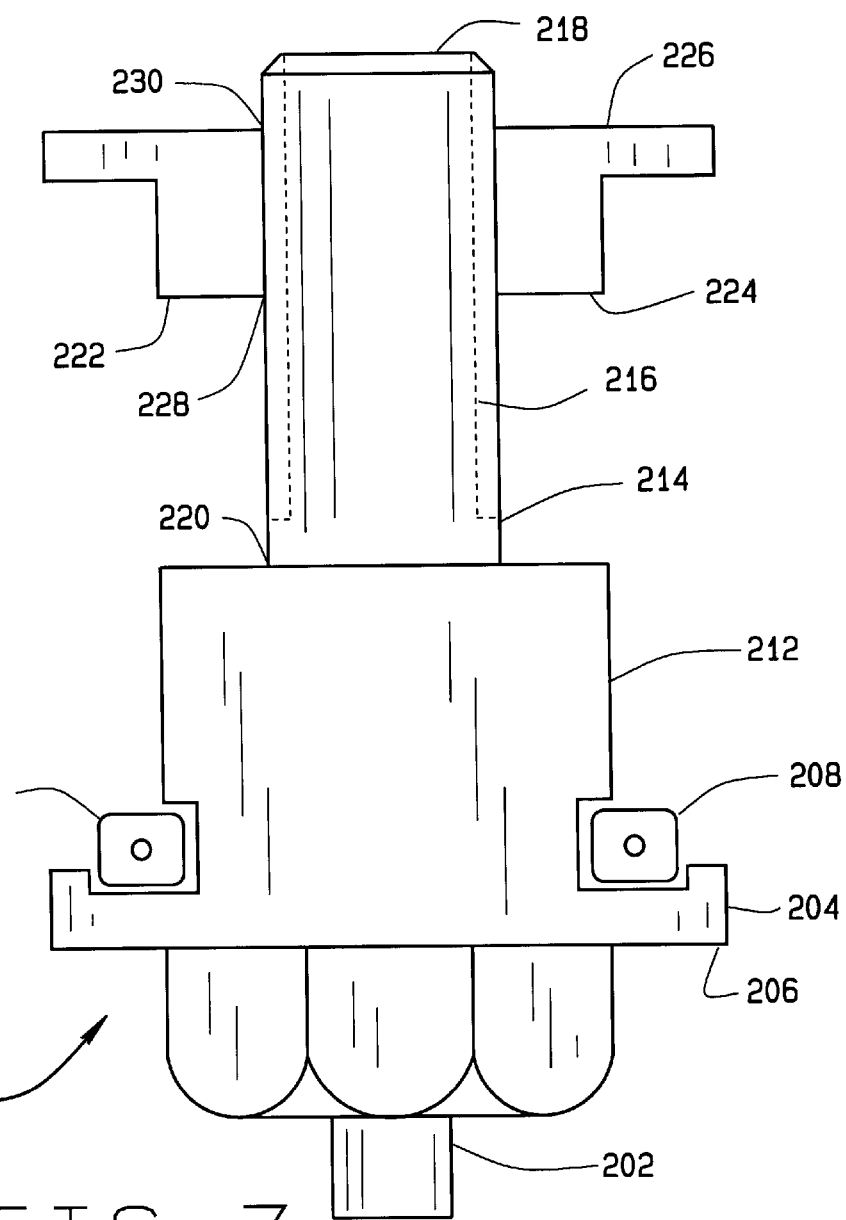
FIG. 7 is a schematic view of a second embodiment of a jackscrew cutting tool.

FIG. 7 is a schematic illustration of a second embodiment of a jackscrew machining tool 200 including a drive shaft 202 connected to a tool stop 204 at a first end 206. A cutting edge 208 includes tool inserts 210 which are removably connected to a pilot bushing 212 that extends from tool stop 204. Tool inserts 210 are square in shape and mounted between tool stop 204 and pilot bushing 212.

A feed shaft 214 is fixedly connected to pilot bushing 212, and includes a first plurality of feed threads 216, a top end 218, and a bottom end 220. Jackscrew machining tool 200 further includes a tool guide 222 which includes a first side 224 and a second side 226.

An opening 228 extends through tool guide 222 from first side 224 to second side 226. Tool guide 222 is substantially T-shaped and further includes a plurality of feed threads (not shown) which extend from first side 224 to second side 226 along an inner surface 230 which surrounds opening 228. Feed shaft threads 216 rotatably engage tool guide 222 along the tool guide threads. Tool inserts 210 are square shaped and increase a diameter of cutting edge 208. Pilot bushing 212 is substantially circular in shape, and has a diameter smaller than a diameter of cutting edge 208.

Jackscrew machining tool 200 can be utilized to modify the existing mounting openings in machine base 140 (shown in FIG. 5). Initially, tool guide 222 is affixed adjacent to at least one of the existing mounting openings in machine base 140. Tool guide first end 224 is inserted and extends into the existing mounting openings opposite jacking shoulders 144 (shown in FIG. 5) while second end 226 rests against machine base 140 to prevent tool guide 222 from extending further into the mounting openings.

Tool guide 222 provides a positive feed rate for jackscrew machining tool 200 into at least one of the existing mounting openings by utilizing feed shaft 214. Feed shaft 214 utilizes feed threads 216 to engage tool guide threads (not shown), with the positive feed rate being the rate at which cutting edge 208 cuts jacking shoulders 144 (shown in FIG. 5) without damaging machine base 140 or jackscrew machining tool 200. Utilizing feed shaft 214 along with tool guide 222, provides a self feeding feature for machining tool 200. The self feeding feature of tool 200 may be further adjusted by selection of the pitch of feed threads 216. Once the existing mounting openings in machine base 140 are modified, second end 16 (shown in FIG. 1) or 56 (shown in FIG. 2) of respective jackscrew insert 10 (shown in FIG. 1) or 50 (shown in FIG. 2), may be initially inserted into modified mounting openings 142 (shown in FIG. 5). First portion 26 (shown in FIG. 1) or 60 (shown in FIG. 2) of jackscrew insert 10 or 50, respectively, then rests against jacking shoulders 144.

Figure 8:
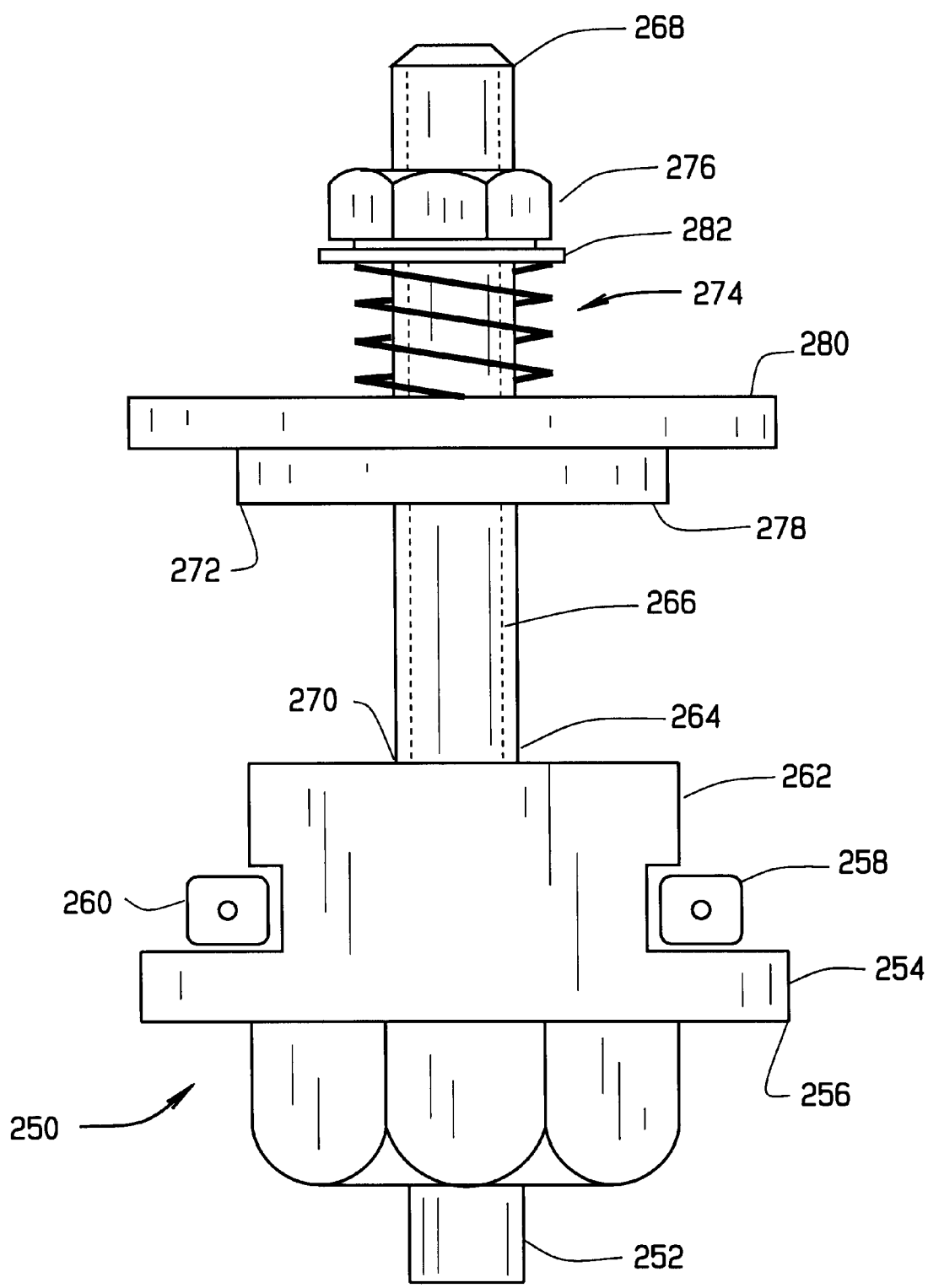
FIG. 8 is a schematic view of a third embodiment of a jackscrew cutting tool.

FIG. 8 is a schematic illustration of a third embodiment of a jackscrew machining tool 250 including a drive shaft 252 connected to a tool stop 254 at a first end 256. A cutting edge 258 includes tool inserts 260 which are removably connected to a pilot bushing 262 which extends from tool stop 254 and first end 256. Tool inserts 260 are square in shape and mounted between tool stop 254 and pilot bushing 262.

A feed shaft 264 includes a plurality of feed threads 266, a top end 268, and a bottom end 270 which is fixedly connected to pilot bushing 262. Jackscrew machining tool 250 further includes a tool guide 272, a preload spring 274, and a spring preload nut 276 adjacent feed shaft top end 268. Tool guide 272 includes a first side 278, a second side 280, and an opening (not shown) which extends through tool guide 272 from first side 278 to second side 280. Tool guide 272 is substantially T-shaped and further includes a plurality of feed threads (not shown) which extend from first side 278 to second side 280 along an inner surface (not shown) which surrounds the tool guide opening.

Feed shaft threads 266 extend through and rotatably engage tool guide 272 along the tool guide feed threads. Cutting edge 258 is wider than pilot bushing 262. Spring preload nut 276 is mounted adjacent feed shaft top end 268 with a thrust bearing 282 mounted on top of preload spring 274 and below spring preload nut 276 which is located between feed shaft top end 268 and tool guide second side 280.

Jackscrew machining tool 250 operates similarly to jackscrew machining tool 200 (shown in FIG. 7) except that the positive feed rate is controlled and adjusted by utilizing a force generated by preload spring 274 and spring preload nut 276. Preload spring 274 and spring preload nut 276 generate the force applied onto tool guide 272. The force generated by preload spring 274 and spring preload nut 276 onto tool guide 272 is utilized to compensate for cutting through various materials by tightening preload spring 274 utilizing spring preload nut 276. The tightening of spring preload nut 276 compresses preload spring 274, and the force generated by compressed preload spring 274 acts to feed tool 250 through the existing mounting openings while cutting edge 258 and pilot bushing 262 are rotated. The relative compression of preload spring 274 can be periodically adjusted to provide the positive feed rate necessary for tool 250.

Utilizing feed shaft 264 along with tool guide 272, preload spring 274, and spring preload nut 276 provides a force feeding feature for machining tool 250 which may be further adjusted by selection of the pitch of feed threads 266. Once the existing mounting openings in machine base 140 (shown in FIG. 5) are modified, first portion 26 (shown in FIG. 1) or 60 (shown in FIG. 2) of jackscrew insert 10 (shown in FIG. 1) or 50 (shown in FIG. 2), respectively, may be inserted into modified mounting openings 142 (shown in FIG. 5) and rest against jacking shoulders 144 (shown in FIG. 5) to provide transference of the jacking forces from machine base 140 utilizing jackscrew 136 (shown in FIG. 3).

Third portion 64 (shown in FIG. 2) of jackscrew insert 50 extends through modified mounting openings 142 and may be secured with a wrench (not shown) or a similar device (not shown) which prevents the rotation of jackscrew insert 50 when jackscrew 136 is being rotated. However, the selection of construction materials can provide sufficient friction between jackscrew insert 10 or 50 and modified mounting openings 142 such that third portion 64 of insert 50 may be unnecessary.

The diameter of second portion 28 (shown in FIG. 1) or 62 (shown in FIG. 2) is also selected such that respective cylindrical member 12 (shown in FIG. 1) or 52 (shown in FIG. 2) of inserts 10 or 50, respectively, are compatible with the existing mounting opening diameter. The modification of the existing mounting openings may be performed during manufacture or later in the field of service. However, if the existing mounting openings are not modified for utilization of jackscrew inserts 10 or 50, then jackscrew assembly 100 may be utilized.

The modification of the existing mounting openings is quickly made utilizing jackscrew machine tool 150 (shown in FIG. 6), 200, or 250 along with jackscrew insert 10 or 50. Also, jackscrew assembly 100 provides for utilization of jackscrew 136 without the modification of the existing mounting openings. Utilization of jackscrew insert 10 or 50, or jackscrew assembly 100 allows for conversion from jackscrew openings to mounting openings.

While the invention has been described in terms of various specific embodiments, those skilled in the art will recognize that the invention can be practiced with modification within the spirit and scope of the claims.

What is claimed is:

1. A jackscrew assembly comprising:
    a first member comprising a first inside surface, a first outside surface, and a first opening, said first inside surface, said first outside surface, and said first opening extending from a first top end to a first bottom end of said first member;
    a second member connected to and surrounded by said first member, said second member comprising a second inside surface, a second outside surface, and a second opening, said second inside surface, said second outside surface, and said second opening extending from a second top end to a second bottom end of said second member;
    a plurality of jackscrew threads on said second member inside surface, said jackscrew threads extending from said second member top end to said second member bottom end; and
    a plurality of jam nut threads on said second member outside surface, said jam nut threads extending along said second member outside surface.

2. A jackscrew assembly comprising:
    an integral first member comprising a first inside surface, a first outside surface, and a first opening, said first inside surface, said first outside surface, and said first opening extending from a first top end to a first bottom end of said first member;
    a second member connected to and surrounded by said first member, said second member comprising a second inside surface, a second outside surface, and a second opening, said second inside surface, said second outside surface, and said second opening extending from a second top end to a second bottom end of said second member; and
    a plurality of jackscrew threads on said second member inside surface, said jackscrew threads extending from said second member top end to said second member bottom end.

3. A jackscrew assembly in accordance with claim 2 wherein said second member includes at least one flattened area extending from said second member top end toward said second member bottom end.

4. A jackscrew insert comprising:
    a substantially cylindrical member comprising a first end, a second end, and an opening therethrough, said opening extending from said first end to said second end, said substantially cylindrical member further comprising an inside surface and an outside surface;

a first plurality of threads on said inside surface, said first plurality of threads extending from said first end to said second end of said substantially cylindrical member;

said substantially cylindrical member further comprises a first portion extending radially outward to form a circumferentially extending shoulder for resting against a jacking shoulder, said first portion adjacent said first end, said first portion having a first diameter, said first portion configured for resting against a jacking shoulder;

said substantially cylindrical member further comprises a second portion extending substantially along said cylindrical member from said first portion towards said second end, said second portion having a second diameter; and said substantially cylindrical member further comprises a third portion, said third portion extending from said second end to said second portion, said third portion having at least one flattened area.

5. A jackscrew assembly in accordance with claim 3 wherein said second member top end extends beyond said first member top end.

6. A jackscrew assembly in accordance with claim 2 further comprising a second opening extending through said first member from said bottom end toward said top end.

7. A jackscrew assembly in accordance with claim 1 further comprising at least one jam nut connected to said first member, said jam nut threadedly engaging said second member.

8. A jackscrew assembly in accordance with claim 2 wherein said second bottom end is cone shaped, said second bottom end extending beyond said first bottom end.

* * * * *